United States Patent [19]

De Busscher

[11] 4,332,262
[45] Jun. 1, 1982

[54] COMBINE HARVESTER

[75] Inventor: Cyriel R. J. De Busscher, Damme, Belgium

[73] Assignee: Sperry Corporation, New Holland, Pa.

[21] Appl. No.: 206,739

[22] Filed: Nov. 13, 1980

[30] Foreign Application Priority Data

Nov. 14, 1979 [GB] United Kingdom ............... 7939370

[51] Int. Cl.³ ............................................. A01D 45/00
[52] U.S. Cl. ..................................... 130/27 P; 56/14.6
[58] Field of Search ................. 130/27 R, 27 P, 27 Q, 130/27 H; 56/14.6

[56] References Cited

U.S. PATENT DOCUMENTS

| 323,726 | 8/1885 | Payne | 130/27 Q |
| 642,792 | 2/1900 | Hay | 130/27 H |
| 756,728 | 4/1904 | Stewart | 130/27 R |
| 3,946,746 | 3/1976 | Decoene et al. | 130/27 P |
| 4,100,720 | 7/1978 | Carnewal et al. | 130/27 R |

Primary Examiner—Robert A. Hafer
Attorney, Agent, or Firm—James R. Bell; Frank A. Seemar

[57] ABSTRACT

A harvesting machine comprising a transversely extending threshold mechanism having a threshing cylinder cooperable with a threshing concave for threshing a layer of crop material fed therebetween and a separating mechanism having a separator rotor cooperable with a separator housing including a separator concave and disposed parallel to the threshing mechanism. Crop layer dividing means are foreseen on the separator rotor for dividing the layer of crop material received from the threshing mechanism into two portions. Separator means extend lengthwise of the separator rotor and are arranged spirally to convey said portions of the layer received from the threshing mechanism around said rotor in opposite directions to the opposite ends of the separating mechanism while submitting the crop material to a separating action.

28 Claims, 14 Drawing Figures

COMBINE HARVESTER

BACKGROUND OF THE INVENTION

The present invention relates to combine harvesters and more particularly to the cleaning mechanism on such combine harvesters.

In known combine harvesters, grain is threshed and separated in a threshing and separating mechanism and the separated grain, together with impurities of all sorts, such as chaff, dust, straw particles, tailings, etc. is fed to a cleaning mechanism for cleaning. Clean grain is collected therebelow and fed to a graintank for temporary storage. The tailings are separated from the clean grain and impurities for reprocessing. This reprocessing either means recycling the tailings through the threshing and separating mechanism or treating them in a separate tailings rethreshing means.

Recent developments in combine harvesters have led to so called rotary combines wherein both threshing and separating are accomplished in mechanism comprising rotary components cooperable with stationary threshing, respectively separating concaves and grates. In conventional combines separating is accomplished by straw walkers. In rotary combines the crop material is subjected to a much more aggressive and positive separating action during a relatively prolonged period of time whereby the efficiency of a rotary combine usually is greater than the efficiency of a conventional combine.

Several types of rotary combines have now already appeared on the market or will appear on the market soon. In one such rotary combine a conventional transversely extending threshing mechanism having a threshing cylinder and a cooperable concave is combined with a rotary separating mechanism of a width greater than that of the threshing mechanism and which is disposed parallel thereto with its ends extending transversely past the respective ends of the threshing mechanism and being arranged spirally to convey the crop material received from the threshing mechanism towards each of its ends while submitting the crop to a separating action.

Such a rotary separating mechanism comprises at least one separator rotor rotatable within a rotor housing comprising separator concaves over its entire circumference, except at its top where covers are provided. Rearwardly of the separator housing a deflector member is provided which deflects grain separated in the rear, generally upright separator concave towards the cleaning device therebelow. This deflector member together with said concave and a section of the combine chassis form a downwardly facing cavity.

The rotor or rotors comprise crop treating and conveying elements which are disposed at an angle relative to the rotor axis. In practice it has now been experienced that these crop treating and conveying elements create air streams around the or all rotors which are directed from centrally below and rearwardly of said rotor or rotors in an upward direction around and over top thereof towards locations in front of and below the outer sections of said rotor or rotors. As a result thereof, light particles such as chaff, short straw, etc. are lifted from the cleaning mechanism and sucked into said cavity which soon is filled up therewith and which thus results in a plugging of the separator concave partially defining said cavity.

In the separating mechanism described above, the incoming layer of crop material should be divided in two substantially equally sized halves, each of which is then spirally conveyed from the center portion of the separating mechanism to one of the opposite ends. Occasionally tough crops such as wet, green crops with long straw or heavily weed infested crops cause problems in as far as the above described division of the crop layer is not accomplished as smoothly and fluently as is desired.

Furthermore, the separating efficiency may vary with varying crops and crop conditions and occasionally this efficiency is not fully satisfactory. This appears to be due to a great extent to the fact that the layers of crop material occasionally do not move smoothly and regularly through the separator mechanism whereby grain separation is hampered.

However, in general rotary combine harvesters have a substantially increased threshing and separating capacity. This results in a much heavier loading of the cleaning mechanism which now frequently appears to have become the capacity limiting factor. (On conventional combines, the straw walkers usually are the capacity limiting factor). This is particularly true for still another reason. Indeed, as is experienced, rotary combines produce more short straw particles, etc. which means an additional loading of the cleaning mechanism. Increasing the size, such as the width of a cleaning mechanism, has not solved the problem.

Indeed, in wide cleaning devices, it has been experienced to be very difficult to provide a substantially constant cleaning air blast transversely of the cleaning mechanism. Uneven transverse air blast pattern, necessarily results in an inferior operation of the cleaning mechanism.

Also, because of the increased volumes of material to be handled in cleaning devices on rotary combines, it has become necessary to provide cleaning fans of a much greater capacity. This has proven to be difficult to obtain so far, unless the size of the fan is made considerably larger. However, preferably, cleaning fans should no longer be increased in size.

Furthermore, the chaffer sieve of conventional cleaning devices easily gets overloaded with the increased volumes of material to be processed in the cleaning device, and thus sieve losses under these circumstances soon reach an unacceptable level.

Finally, if no special precautions were taken, material separated in the separating mechanism would fall directly onto the chaffer sieve at a location rearwardly of its leading edge. This may result in increased sieve losses as grain in this material does not get enough time to be separated from the impurities and to fall through the meshes in the sieve.

The foregoing illustrated limitations of the known prior art. Thus, it is apparent that it would be advantageous to provide an alternative directed to overcoming one or more of the limitations as set forth above.

SUMMARY OF THE INVENTION

In one aspect of the present invention this is accomplished by providing a combine harvester including a threshing mechanism and a separator mechanism in parallel disposition therewith. Crop layer dividing means divides crop material received from the threshing mechanism into two portions. The separator mechanism is arranged spirally to convey the portions from the threshing mechanism around a separator rotor in opposite directions to opposite ends of the separating mechanism while submitting the crop material to a separating action.

The foregoing and other aspects will become apparent from the following detailed description of the invention when considered in conjunction with the accompanying drawings. It is to be expressly understood, however, that the drawings are not intended as a definition of the invention but are for the purpose of illustration only.

DESCRIPTION OF THE PREFERRED EMBODIMENT

While the terms "grain", "straw", and "tailings" are used principally throughout this specification for convenience, it should be understood that these terms are not intended to be limiting. Thus "grain" refers to that part of the crop which is threshed and separated from the discardable part of the crop material which is referred to as "straw". Incompletely threshed ears are referred to as "tailings".

Also the terms "forward", "rearward", "left", "right", etc. when cited in connection with the combine harvester and/or components thereof are determined with reference to the forward operative travel of the combine harvester in the field and should not be understood to be limiting.

Figure 1:
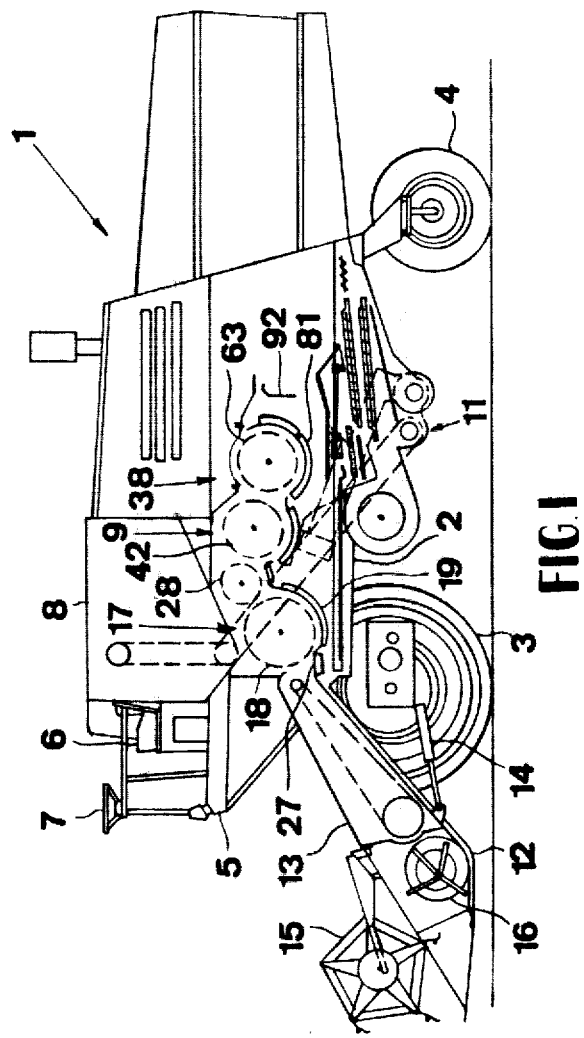
FIG. 1 is a diagrammatic side view of the combine harvester embodying the present invention.

With reference to the drawings, particularly FIG. 1, the combine harvester, generally indicated at 1 comprises a main chassis 2 supported on a front pair of drive wheels 3 and a rear pair of steerable wheels 4. Supported on the main chassis 2 are an operator's platform 5 with a driver's seat 6 and a steering wheel 7, a grain tank 8, a threshing and separating mechanism indicated generally at 9, a grain cleaning mechanism 11 and an engine (not shown). A conventional header 12 and straw elevator 13 extend forwardly of the main chassis 2 and the header is pivotally secured to the chassis for general vertical movement which is controlled by extensible hydraulic cylinders 14.

As the combine harvester 1 is propelled forwardly over a field with standing crop, the latter is severed from the stubble by a sickle bar (not shown) on the header whereafter a reel 15 and a header auger 16 convey the cut crop to the straw elevator 13 which supplies it to the threshing and separating mechanism 9. The crop received within the threshing and separating mechanism 9 is threshed, that is to say, the crop (which may be wheat, corn, rice, soybeans, rye, grass seed, barley, oats or other similar crops) is rubbed and beaten whereby the grain, seed or the like, is loosed and separated from the straw stalks, coils or other discardable part of the crop.

Grain which has been separated from the straw falls onto the grain cleaning mechanism 11 which comprises means to separate chaff and other impurities from the grain and means to separate unthreshed material (known in the art as tailings). Cleaned grain is then elevated into the grain tank 8 and the tailings are fed either to a separate rethresher or to the threshing and separating mechanism 9 for a renewed threshing action.

The header as described is of the grain type, but clearly other forms of headers may be employed, as for example a corn header, depending on the crop to be harvested.

The threshing portion 17 of the threshing and separating mechanism 9 comprises a rotatable threshing cylinder 18 cooperable with a stationary threshing concave 19. The threshing cylinder 18 is composed of a plurality of transversely spaced apart flanges 21 keyed on a transversely extending shaft 22 rotatably mounted on the main chassis 2. Around their peripheries the flanges 4 support a plurality of conventional rasp bars 23 which extend over a width generally corresponding to the width of the straw elevator 13 and the main chassis 2.

The threshing concave 19 is composed of a number of fore-and-aft extending arcuate main bars 24 and a plurality of transversely extending threshing bars 25. Furthermore, a plurality of arcuate wires 26 extend at regular intervals in fore-and-aft direction through apertures in the bars 12 thus defining therewith a mesh for the separation of grain therethrough. The threshing concave 19 extends over about 100° from generally below the lower end of the threshing cylinder 18 in the vicinity of the discharge end of the straw elevator 13 to a location generally at the rearwardmost portion of said threshing cylinder and generally at the level of the shaft 22 thereof. Usually a stone trap 27 is provided between the discharge end of the straw elevator 13 and the forward edge of the threshing concave 19.

Rearwardly of the threshing mechanism 17, a deflector beater or so called straw beater 28 with an associated beater grate 29 is provided. The straw beater 28 has a smaller diameter than the threshing cylinder 18 and is arranged above the level of the discharge end of the threshing concave 19. The straw beater 28 and beater grate 29 have substantially the same width as the threshing mechanism 17. The straw beater 28 comprises a generally cylindrical body portion 31 mounted on a transverse shaft 32 with a number of deflector plates 33 supported thereon. The deflector plates 33 extend the full width of the straw beater 28 and are inclined rearwardly relative to the direction of rotation 34 of said beater.

The structure of the grate 29 is similar to that of the threshing concave 19 in that it comprises fore-and-aft extending arcuate main bars 35, transversely extending bars 36 and fore-and-aft extending wires 37. Similarly as the threshing concave 19 is adjustable relative to the threshing cylinder 18, the beater grate 29 may be made adjustable relative to the straw beater 28. The beater grate 29 spans an arc of about 50°-60° and is disposed substantially horizontally rearwardly of the discharge end of the threshing concave 19.

The separating portion 38 of the threshing and separating mechanism 9 comprises a first and a second component generally indicated at 39, respectively 41. The first separator component 39 is composed of a rotary separator cylinder 42 which is cooperable with a stationary separator concave 43.

The separator cylinder 42 comprises a plural number of transversely spaced apart flanges 44 mounted on a shaft 45. A plural number of supporting bars 46 are mounted on the flanges 44 which carry a plurality of tines 47 in a manner so that tines of one supporting bar are staggered transversely relative to the tines of the adjacent supporting bars. The tines 47 are elongate in shape and formed with an active front surface 48 and a pair of reinforcing side flanges 49. The active front surfaces 48 are inclined rearwardly relative to the direction of rotation 51 of the separator cylinder 42 to a degree such that they extend more or less parallel to the direction of movement of the crop issuing from the straw beater 28 and beater grate 29 at the point where said tines 47 intercept said crop. At this point of interception the tines are moving in a downward direction and to this end the shaft 45 is arranged below the level of the shaft 32 of the straw beater 28. The diameter of the separator cylinder 42 substantially corresponds to the diameter of the threshing cylinder 18 and is thus larger than the diameter of the straw beater 28.

The separator concave 43 extends downwardly and rearwardly from the rear end of the beater grate 29 and wraps around the separator cylinder 42 over an angle of about 120°. The separator concave 43 in fact is composed of three sections indicated respectively at 52,53 and 54, of different aggressiveness the most aggressive section being positioned at the forward end and the least aggressive section being positioned at the rearward end.

The forward concave section 52 comprises, similarly as the threshing concave 19 a number of arcuate fore-and-aft extending bars 55 and a number of transverse bars 56. Parallel to the arcuate bars 55 and through apertures in the transverse bars arcuate wires 57 are provided, which together with the transverse bars 56 define the mesh of the concave section 52.

The middle concave section 53 equally comprises arcuate fore-and-aft extending bars 58, which however carry transverse bars 59 in the form of inverted U-shaped members. Arcuate wires 61 extend through apertures in the bars 59 and define therewith the mesh of the concave section.

The rear concave section 54 is in fact formed solely by extensions of the concave wires 61 rearwardly of the rearwardmost transverse U-shaped bar 59. This rear concave section 54 has a slight upward incline relative to the horizontal with the rear end thereof bent downwardly to form a smooth transition.

The width of the separator cylinder 42 and associated concave 43 correspond to the width of the threshing mechanism 17 and the straw beater 28. The size of the various components of the threshing mechanism 17, the straw beater 28 and associated grate 29 and the first separator component 39; and the position of these components relative to each other have enabled to provide separator surfaces (concaves and grates) of a length exceeding substantially the length occupied by said components in the machine.

The second separator component 41 basically comprises a rotor housing 62 with a separator rotor 63 therein. Both said components have a width substantially exceeding the width of the separator cylinder 42. Preferably, the rotor housing 62 has a width which is about twice the width of the separator cylinder 42 or slightly less.

The separator rotor 63 comprises a central shaft 64 with a plurality of flanges 65 mounted thereon and upon which are secured U-shaped profiles 66 which extend the full length of the rotor. The U-shaped profiles have their bottom edges spaced apart from the flanges 65 and apart from the adjacent U-shaped members. Six such U-shaped profiles 66 are provided and the gaps between adjacent profiles 66 are closed off by plates 67 so that at its outer circumference the rotor body is dodecagonal in shape. Crop treating and conveying elements 68 are provided on the outer circumference of the rotor body and these components will now be described in more detail.

Figure 5:
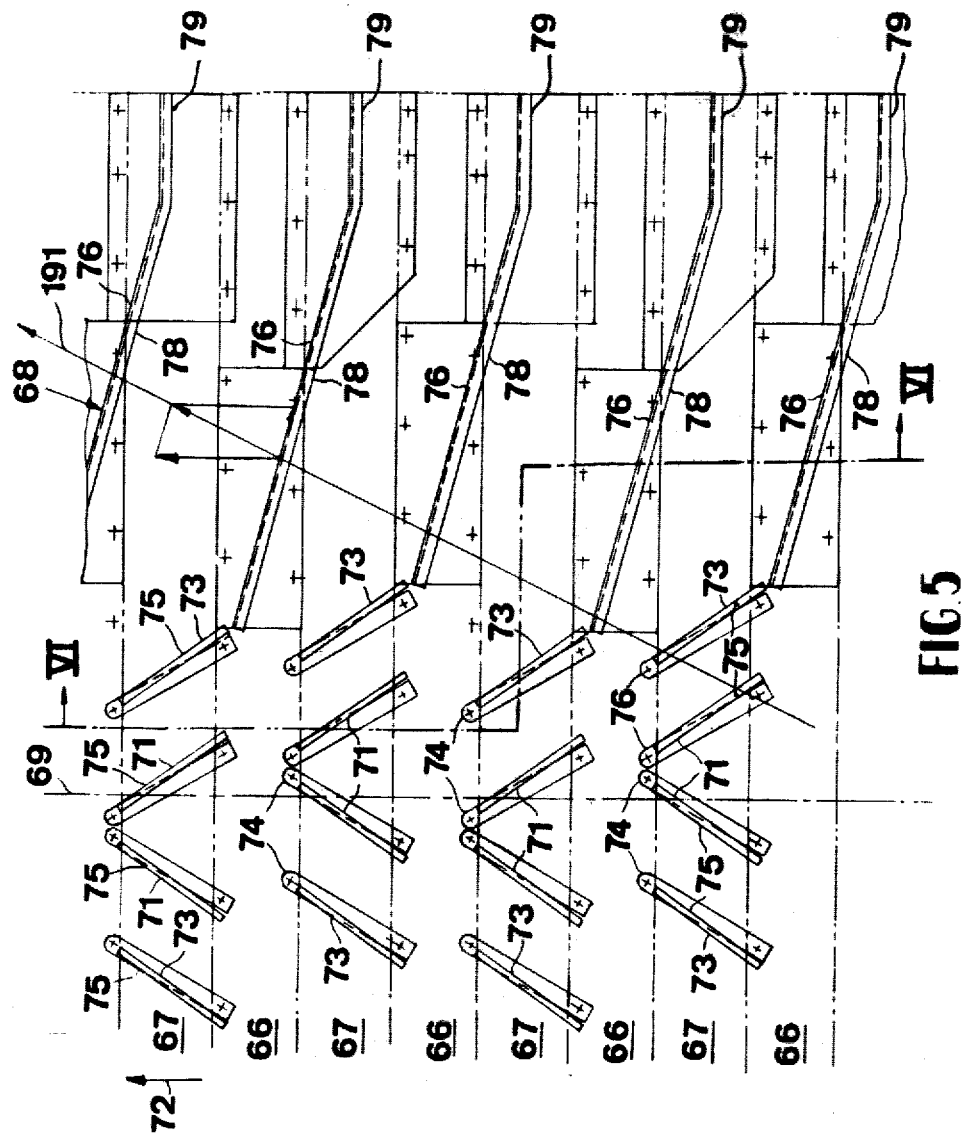
FIG. 5 is a partial schematic development of the component indicated at V in FIG. 3.

FIG. 5 shows a partial schematical development of the rotor 63 with the various components thereon. As it will be seen, this rotor and the various components thereon, are symmetric relative to the fore-and-aft centerline 69 of the machine, except from some minor deviations. Centrally of the rotor, crop layer dividing blades 71 are provided around the rotor body. These blades 71 are arranged in V-shape with the apexes thereof facing in the direction of rotation 72 of the rotor. Adjacent apexes in the rotor circumference are staggered over a short distance relative to the centerline 69. However, the forward edges 74 of each pair of dividing blades 71 equally may be transversely spaced apart over a short distance.

Parallel to, and at a distance from the blades 71 are provided further crop conveying blades 73, which have the same shape as the blades 71. Thus in total four blades are provided in rows lengthwise of the rotor and as six rows are provided, there is a total of twenty-four blades, all of which are inclined at a steep angle relative to the rotor axis. All of these blades 71 and 73 have a rounded leading edge 74 as seen in the direction of rotation 72 and a rounded outer edge 75, both of which are welded to a plate member 76 which is secured to the respective plates 67 of the rotor body. The leading edge 74 extend outwardly from the rotor body and are inclined rearwardly relative to the direction of rotation 72, while that the outer edges 75 are curved in shape. Seen in the direction of movement of the crop material around the rotor adjacent blades 71 and 74 in each row of blades overlap each other.

Figure 6:
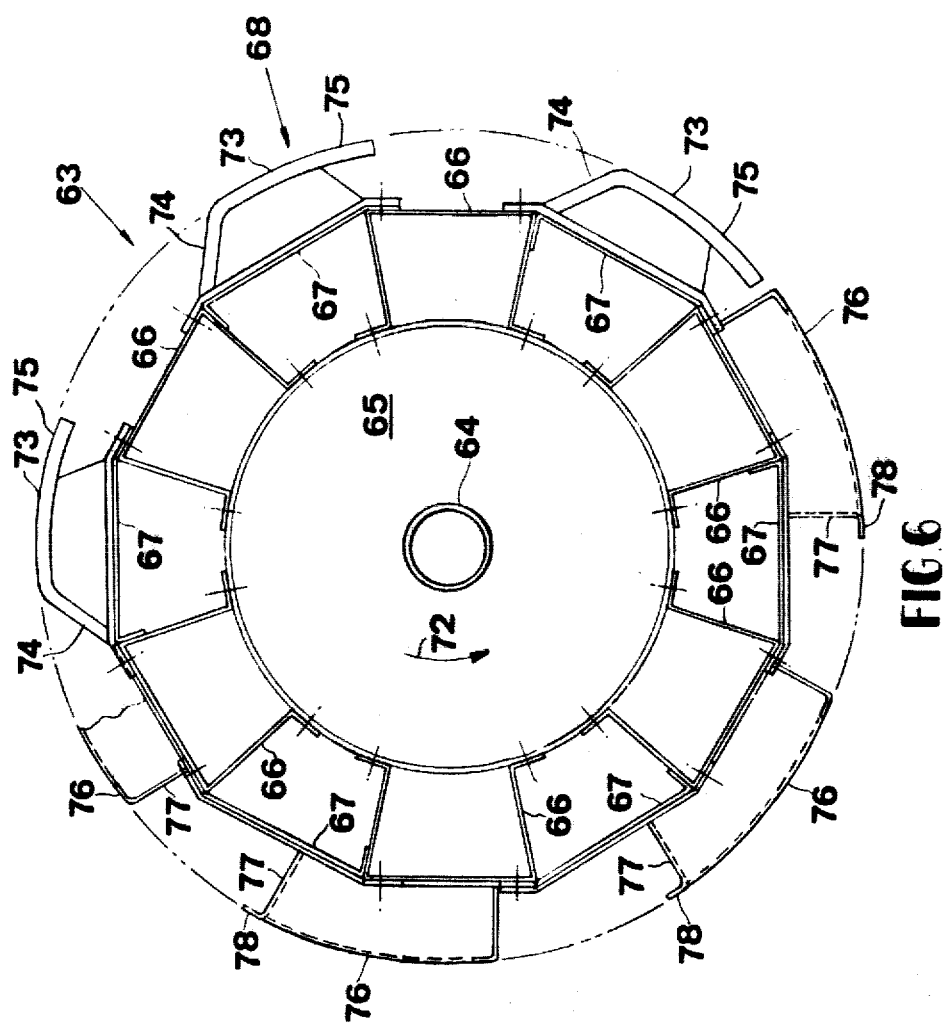
FIG. 6 is a sectional view of the component shown in development in FIG. 5 and taken at the lines VI—VI thereof.

Separator blades 76 extend from the rear ends of the crop conveying blades 73 to locations short of the outer ends of the rotor 63 at an angle relative to the rotor axis which is substantially smaller than the angle of inclination of the blades 73. Preferably the separator blades 76 are inclined at an angle of about 15° while that the blades 73 are inclined at an angle of about 55° relative to the axis. The separator blades 76 are formed of sheet metal and comprise a body 77 extending radially outwardly from the rotor body and having a rearwardly inclined (as seen in the direction of rotation) outer edge 78. As best seen in FIG. 6, the outer edges 78 are curved to coincide with the outer circumscribing line of the rotor assembly. Due to the length thereof and due to their inclination, the separator blades extend over more than one side of the dodecagonal shape of the rotor body. Indeed, the separator blades 76 are partially attached to the bottom ends of the U-shaped profiles 66 and partially to the adjacent plates 67.

At the outer ends of the rotor assembly, the separator blades 76 are extended into discharge blades 79 which are oriented parallel to the rotor axis and which extend radially outwardly from the rotor body. The discharge blades 79 equally are made of sheet metal and have a radially outwardly extending body with an outer rearwardly inclined edge which coincides with the circumscribing line mentioned above.

The rotor housing 62 is partly composed of separator concaves 81 and partly of cover plates 82 with a central forwardly facing inlet 83 and a pair of rearwardly facing outlets 84 at the opposite ends of the rotor housing. The inlet 83 has a width substantially corresponding to the width of the separator cylinder 42 and is disposed to receive crop material therefrom. The outlets 84 have a width which is smaller than half of the width of the inlet 83.

The separator concaves 81 are similar in construction as the separator concave 43 associated with the separator cylinder 42 and comprise arcuate main bars 85, straight transverse bars 86 and arcuate concave wires 87. At the location rearwardly of the inlet 83, when seen in the direction of rotation 72, and below the rotor assembly 63, the separator concaves 81 extend over the full width of the rotor housing 62. This section is indicated at 185 in the drawings. Rearwardly thereof, this means at the section where the rotor housing extends generally upright adjacent the rear end of the rotor, the separator concaves 81 end short of the opposite ends of the rotor housing 62 to define therewith the outlet ends of the rotor housing 62 to defi⋯ therewith the outlets 84 mentioned above. This secti⋯ is indicated at 186 in the drawings. Finally concave sections are equally provided between the side ends of the inlet 83 and the opposite ends of the rotor housing 62 at the forward upright section thereof. These sections are indicated at 187 in the drawings.

Figure 3:
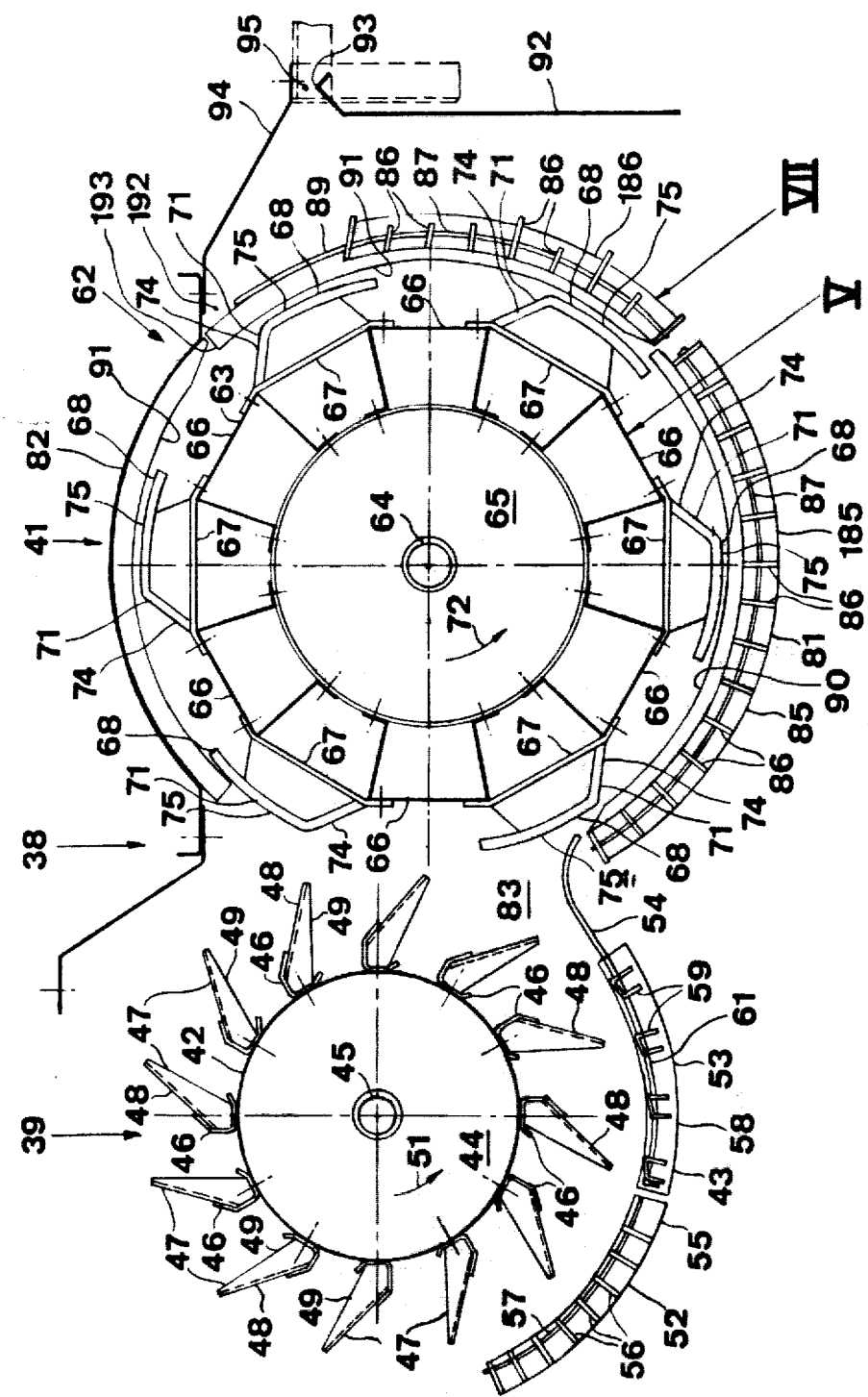
FIG. 3 is a sectional view on a larger scale at the general fore-and-aft center showing the components indicated at III in FIG. 2.
Figure 8:
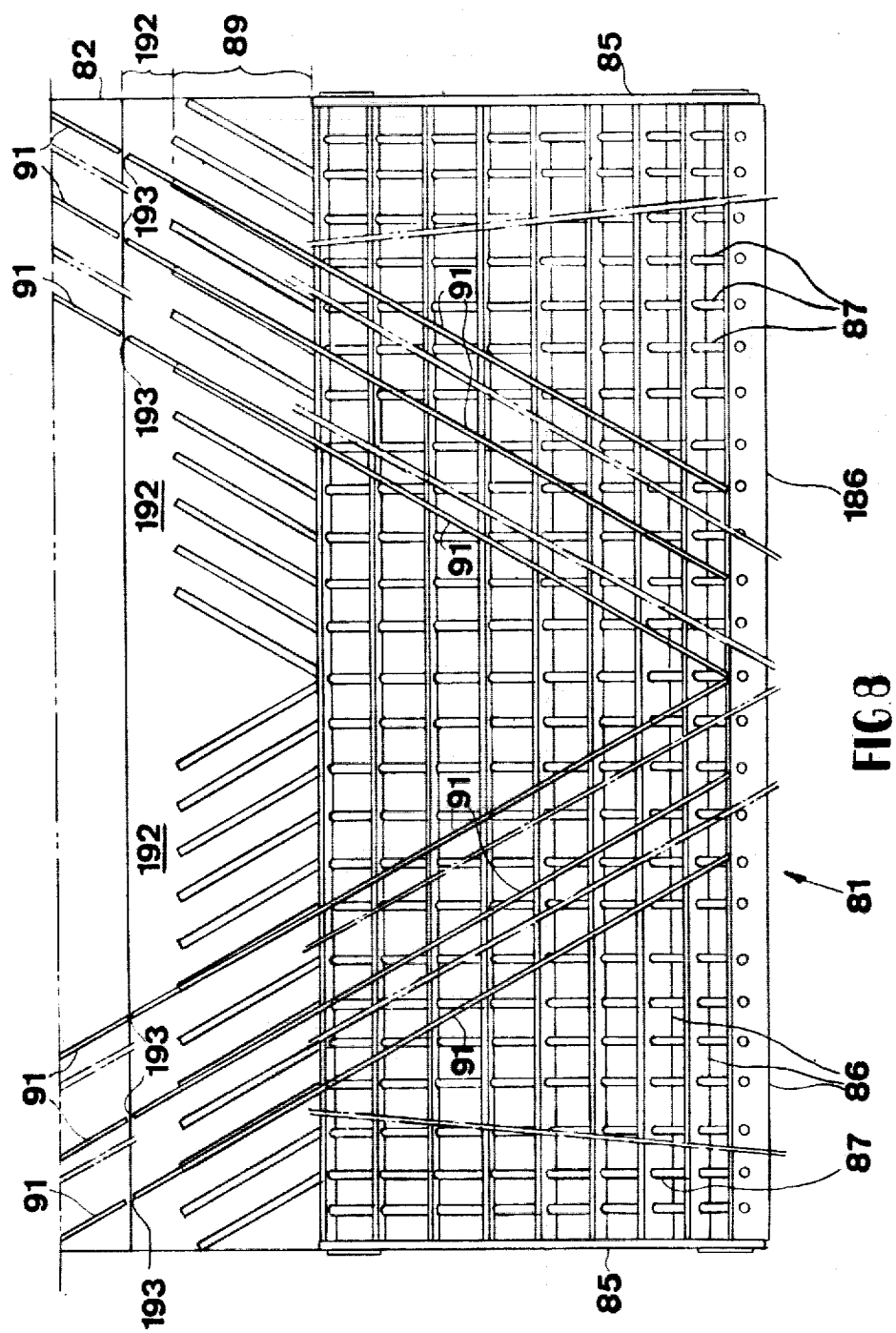
FIG. 8 is a plan view of the components indicated at VIII in FIG. 2.

At the rear end of the separator concaves 186 as seen in the direction of rotation 72 a number of transverse concave bars have been omitted and the concave wires have been inclined towards the opposite ends of the housing 62 thus defining amongst them elongate apertures. This section of the rotor housing is indicated at 89 in the drawings. It will also be noted especially from FIGS. 3 and 8 that the concave wires 87 end short of the adjacent edge of the cover plate 82 and of the forward end of the shielding 94 thus defining therewith an opening which is indicated at 192.

Figure 4:
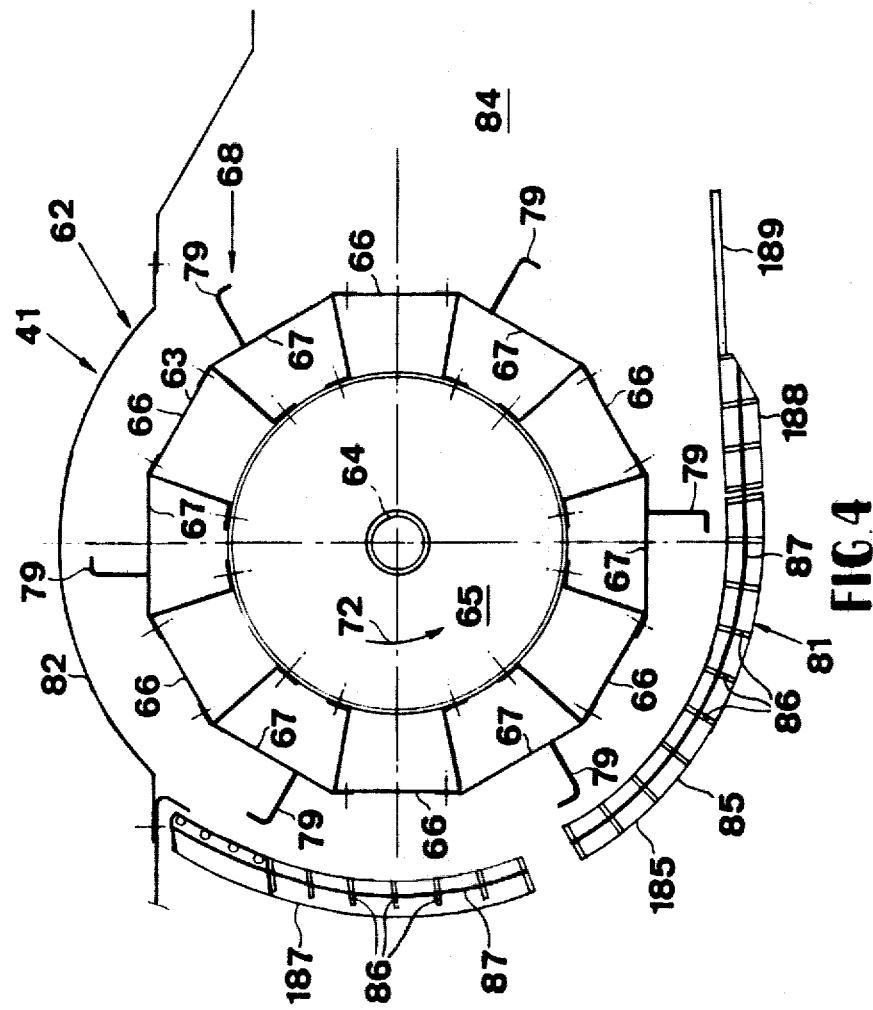
FIG. 4 is a sectional view similar to FIG. 3 taken in the vicinity of one end of the components shown at IV in FIG. 2.

As can be best seen in FIG. 4, the separator concaves 185 have flattened concave sections 188 forwardly of the separator outlets 84 when seen in the direction of rotation 72. These sections extend tangentially to the remainder of the concaves 185 at a location forwardly of said outlets and comprise, similarly as all separator concaves, straight transverse bars 86. The concave wires 87 are made straight as opposed to arcuate in the remainder of the concaves and are extended rearwardly of the rearwardmost bars 86 to form a comb structure 189.

The covers 87 are arcuate in shape and are disposed above the separator rotor 63 between the section 89 of the separator concaves 81 and the top edge of the inlet 83 and are readily removable for easy access to the separator components.

Figure 7:
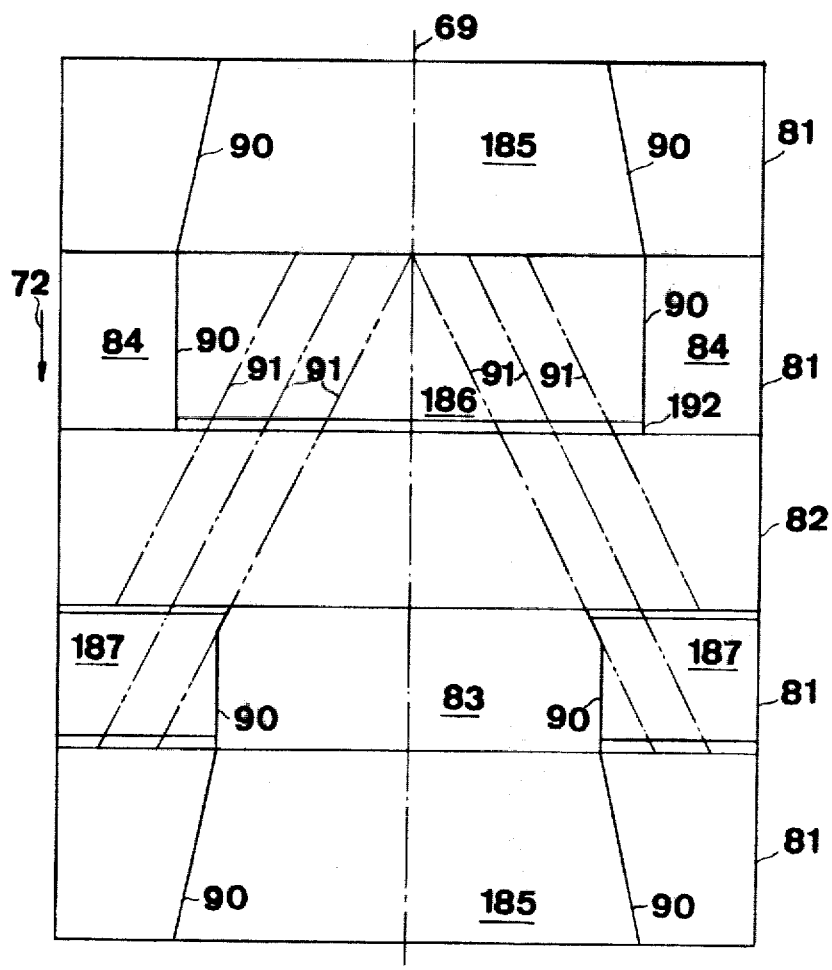
FIG. 7 is a schematic development of the component shown at VII in FIG. 3.

As can be best seen in FIG. 7, deflector fins 91 extend at an angle of about 25° relative to the fore-and-aft center of the machine 69 spirally around the rotor 63 on the inside of the rotor housing 62. Three fins 91 are provided at regularly spaced apart locations and parallel to each other at both sides of the center 69; the inner two of which have their ends in line with the lower edge of the inlet 83 at locations between said inlet and the opposite ends of the housing 62. The outermost fins 91 have their ends aligned with the top edge of said inlet 83. The middle and outer fins 91 on each side of the center have their ends positioned inwardly of the outer ends of the housing 62. As can be best seen in FIG. 7, the central fins 91 thus define a V-shaped pattern with their apex facing in a forward direction and positioned on the centerline of the machine at a location rearwardly of the concave 185. Also the fins 91 partially extend across the separator concaves 81 and across the full width of the cover plate 82. Thus these fins 91 extend across the transverse opening 192 and, to permit removal of the cover plate 82, they are divided at 193. As can be best seen from FIG. 8, the rear ends of the concave wires 87 have the same inclination as the fins 91 and said fins 91 are arranged generally coincident with certain of said end portions of the concave wires 87.

Additional fins 90 extend at an angle across the concave 185 from the lower corners of the inlet 83 to reach a position generally in line with the inner edges of the outlets 84 on the lower portion of the concave 186. These fins 90 are extended parallel to the fore-and-aft center 69 alongside the inner sides of the outlets 84 and alongside the edges of the inlet 83.

Figure 2:
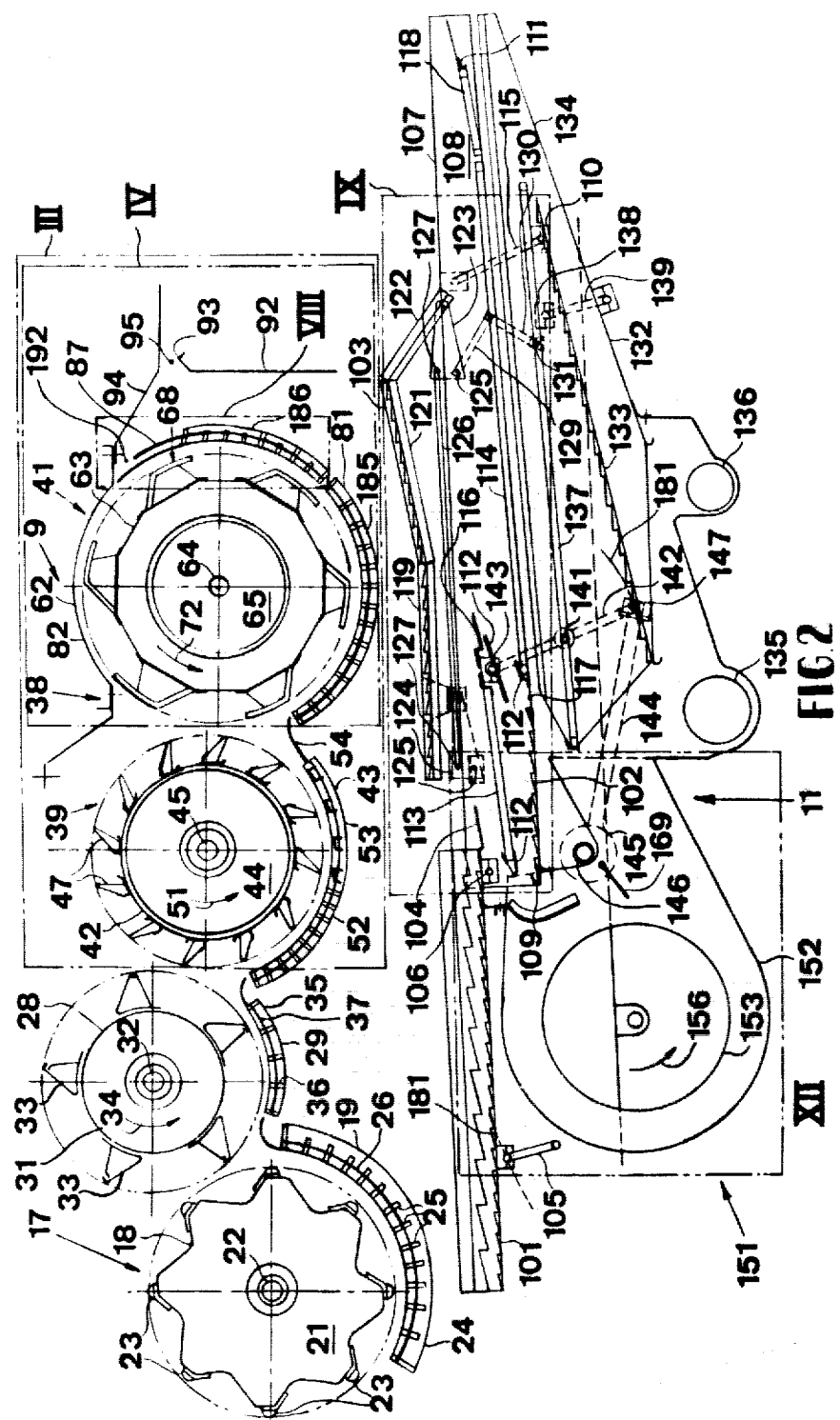
FIG. 2 shows on a larger scale the threshing, separating and cleaning components of the combine harvester of FIG. 1 in side view.

As will be best seen from FIG. 2, the outer generating lines of the various rotatable threshing and separating components are in close relationship with respect to each other. Preferably the threshing cylinder 18, the straw beater 28, the separator cylinder 42 and the separator rotor 63 are driven either at the same circumferential speed or at progressively higher speeds the one with respect to the other.

The rotor housing 62 is arranged in the area above the cleaning mechanism 11 and material separated in the central portion of said housing falls directly onto said cleaning mechanism. Material separated in the outer sections of the rotor housing which extend beyond the sidewalls of the combine is collected separately and conveyed towards and spread across the cleaning mechanism in a manner described in more detail in co-pending application No. filed.

A deflector plate 92 is arranged at a distance rearwardly of the upright rear quarter of the rotor housing 62 at a location between the outlets 84 of said housing for deflecting separated crop material downwardly onto the cleaning mechanism 11 therebelow. The deflector plate 92 is oriented generally vertically and has its lower edge at a short distance above the cleaning mechanism. The upper edge 93 of the deflector plate ends short of a top shielding 94 of the machine chassis so as to define an air inlet 95 therebetween. The reasons for this inlet will be described in more details furtheron.

The cleaning mechanism 11 extends from below the forward edge of the threshing concave 19 to a location rearwardly of the separating mechanism 38 and has a width substantially corresponding to the width of the threshing mechanism. Thus the separator rotor 63 and housing 62 have opposite ends extending beyond the opposite side edges of the cleaning mechanism.

The cleaning mechanism comprises in fact three major components, namely the preparation and transporting surfaces, the cleaning sieves and a cleaning fan.

The preparation and transporting surfaces are corrugated for, together with the oscillatory movement imparted thereto, to prepare the layer of crop material as it is moved to the cleaning sieves. These surfaces comprise a forward, and intermediate and a rearward grain pan 101, respectively 102 and 103.

The first grain pan 101 is quite conventional in shape and extends generally horizontally or at a slight upward incline between locations below the forward end of the threshing concave 19 and the separator concave 43 associated with the separate cylinder 42 and is thus disposed to receive threshed and separated material from the threshing concave 19, the beater grate 29 and a portion of the separator concave 43. Material separated in the outer sections of the rotor housing as well as tailings are spread across the grain pan 101 in a manner as described in co-pending application mentioned above. A conventional comb assembly 104 is secured to the discharge end of the forward grain pan 101.

The forward grain pan 101 is suspended adjacent its forward end on a pair of cranks 105 and at its rear end via pivots 106 to the upper cleaning shoe 107 to be described hereafter in more detail.

Figure 9:
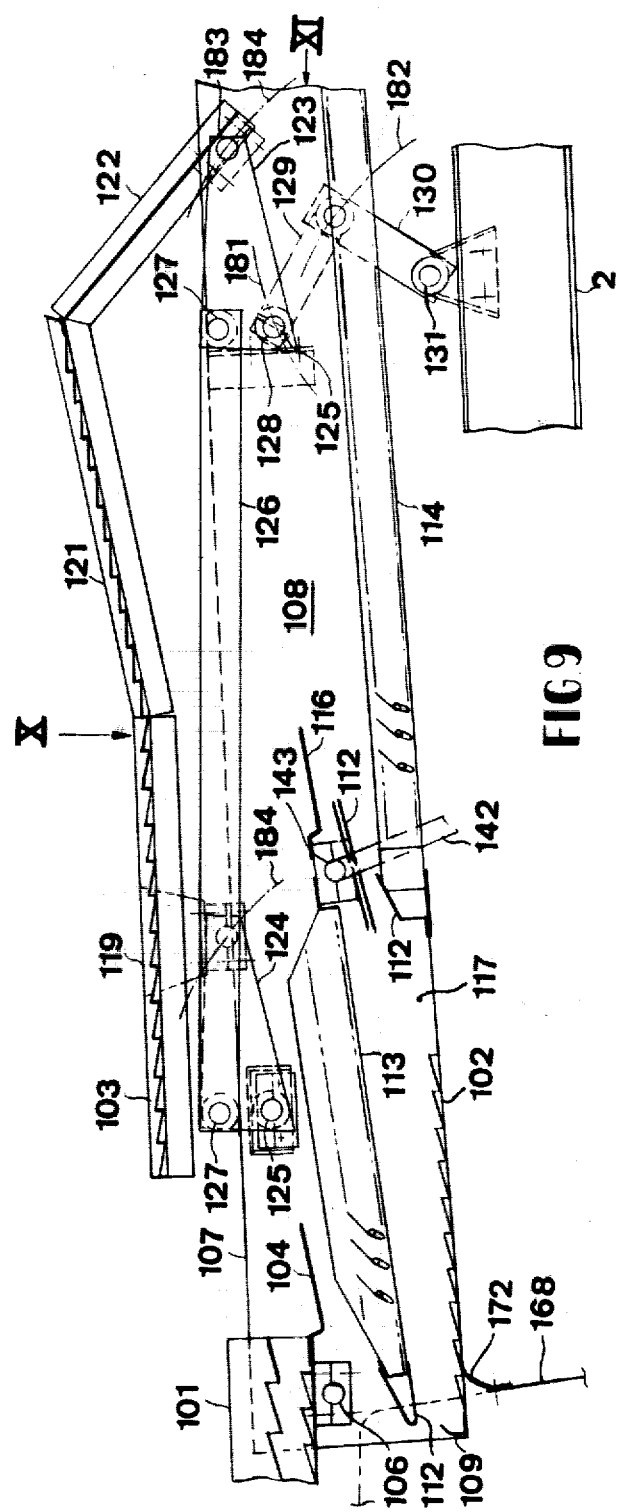
FIG. 9 is a sectional view on a larger scale showing the components indicated at IX in FIG. 2.
Figure 10:
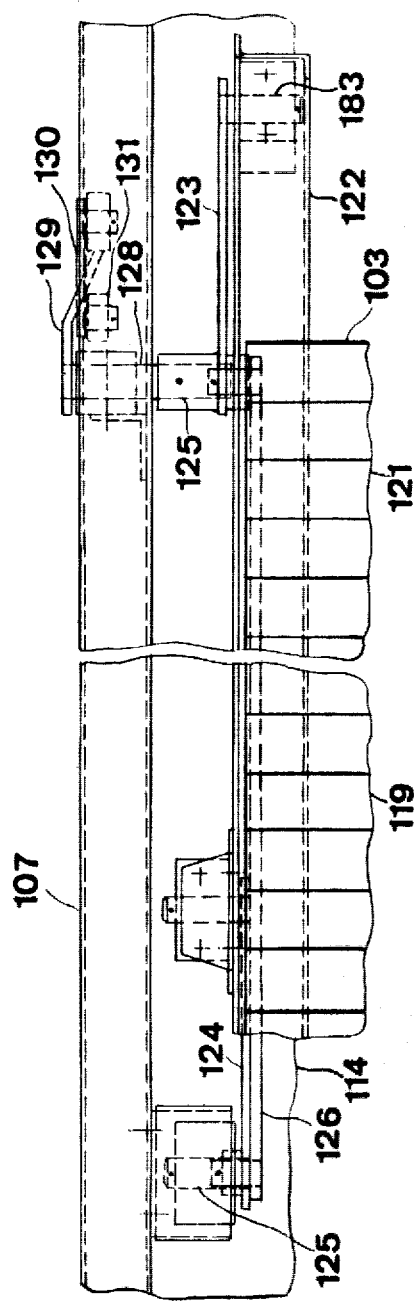
FIG. 10 is a partial view taken in the direction X in FIG. 9.
Figure 11:
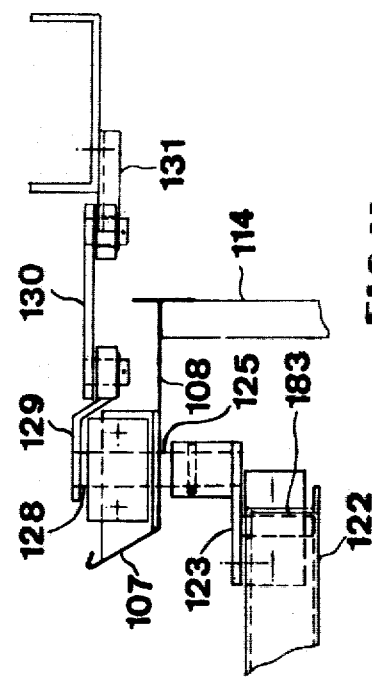
FIG. 11 is a partial view taken in the direction XI in FIG. 9.
Figure 12:
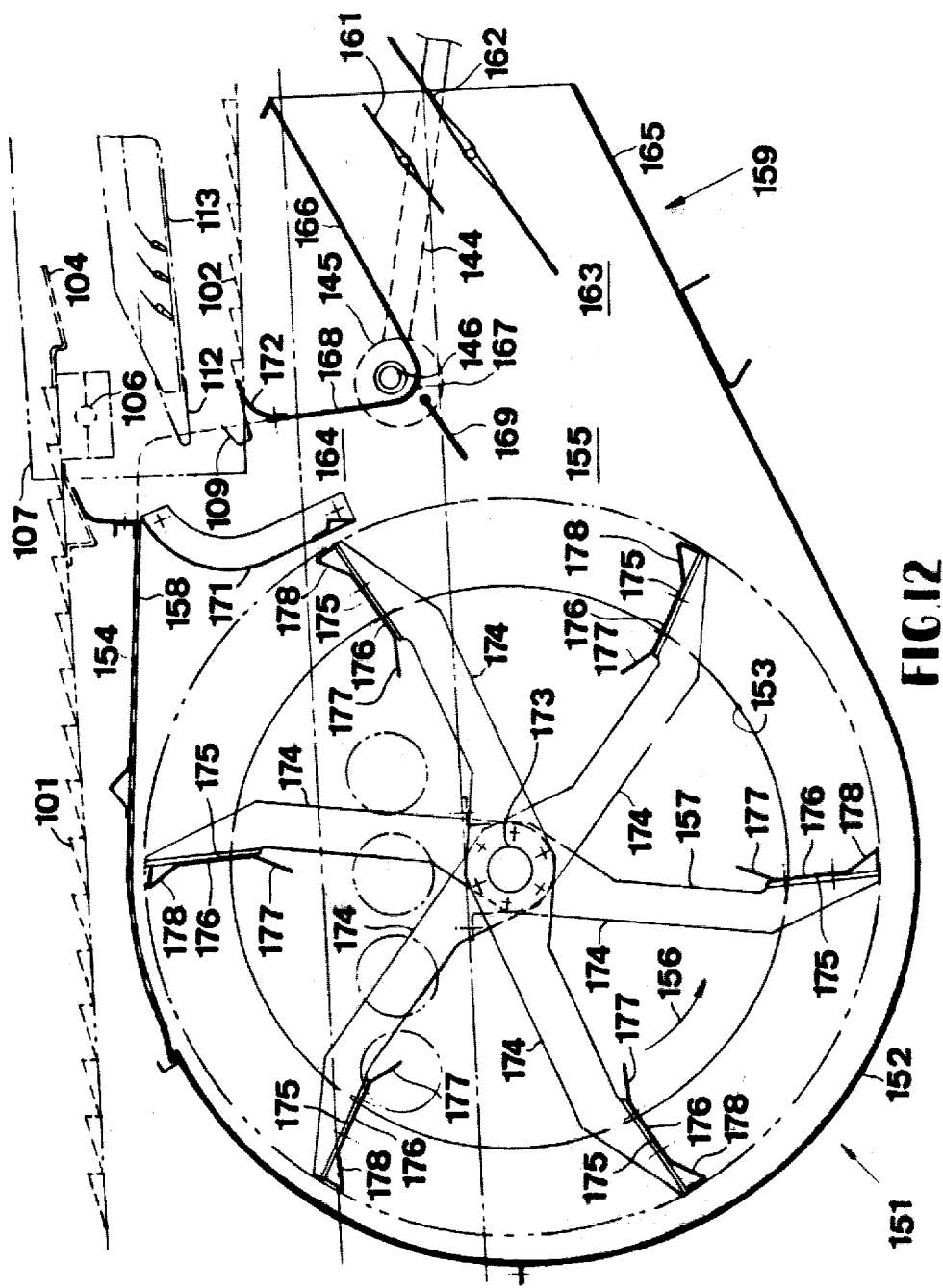
FIG. 12 is a sectional view on a larger scale showing in more details the components indicated at XII in FIG. 2.

The upper cleaning shoe 107 basically is composed of a rectangular frame with opposite side walls 108, first and rear transverse beams, respectively 109 and 111 and intermediate reinforcing beams 112 which, as can be best seen in FIG. 9 equally serve to carry certain components. This upper cleaning shoe extends from the discharge end of the forward grain pan 101 to the rearwardmost end of the cleaning mechanism. Adjacent its rearward end, the upper cleaning shoe 107 is movably supported on the chassis at 110 via rocking arms 115 (only schematically shown, with the chassis portion carrying the lower ends of the rocking arms 115 being omitted). The upper cleaning shoe 107 carries the intermediate grain pan 102, the rear grain pan 103, a precleaning sieve 113 and a chaffer sieve 114.

The precleaning sieve 113 extends rearwardly at a small angle relative to the horizontal from a location below and forwardly of the discharge end of the forward grain pan 101 and comprises a plurality of angularly adjustable and overlapping louvres which together form the mesh for grain to pass through. At its rear end, the precleaning sieve 113 carries a comb assembly 116 similar to the assembly 104.

Below the precleaning sieve 113, the intermediate grain pan 102 is provided which ends short of the rear end of said precleaning sieve 113.

The chaffer sieve 114 is generally aligned with the intermediate grain pan 102 and extends rearwardly at a small angle relative to the horizontal from a location below the discharge end of the precleaning sieve 113. Between the intermediate grain pan 102 and the chaffer sieve 114 a discharge opening 117 is provided. The chaffer sieve 114 is quite conventional in shape and comprises a rearward angularly adjustable extension 118. Similarly as the precleaning sieve 113, the chaffer sieve 114 and its extension 118 comprise a plurality of angularly adjustable and each other overlapping louvres.

The rear grain pan 103 comprises a generally horizontal section 119 and a slightly upwardly inclined section 121 rearwardly thereof and both with corrugations oriented opposite to the corrugations on the front and intermediate grain pan 101 and 102. The rear grain pan 103 extends below the center portion of the separator housing 62 and above the chaffer sieve 114 and a portion of the precleaning sieve 113 and has a forward discharge end slightly rearwardly of the discharge end of the front grain pan 101. The rear edge of the rear grain pan 103 is positioned below the deflector plate 92 and support arms 112 are attached thereto at one of their ends, while that the opposite ends thereof are pivotally mounted on cranks 123 at the opposite sides of the cleaning shoe 107. The rear grain pan 103 is further also pivotally mounted on further cranks 124 adjacent its forward discharge edge. The cranks 123,124 are triangular in shape and are pivotally mounted at 125 on the opposite side walls 108 of the upper cleaning shoe 107. Each pair of cranks 123,124 at each side of the cleaning shoe 107 is coupled at their third corner 127 to each other by a connecting rod 126.

The rear cranks 123 comprise at their pivotal mounting on the cleaning shoe 107, a stub shaft 128 carrying a link 129, the free end of which is pivotally coupled to a further link 130, which in turn is pivotally attached to a portion of the chassis at 131. Accordingly, as the upper cleaning shoe 107 is oscillated along a curved upwardly and rearwardly directed path 181, the pivots between the links 129 and 130 are caused to move along arcuate paths 182 around pivots 131 on the chassis and thus the cranks 123 and the pivots 183 thereon are caused to move along arcuate upwardly directed paths 184 as seen in a forward direction of the machine. This movement transferred to the forward cranks 124 by virtue of the connecting rods 126 and thus the third grain pan 103 is oscillated to throw material in a forward direction.

A lower cleaning shoe 132 is arranged below the upper cleaning shoe 107 and comprises, as is quite conventional, a clean grain conveyor floor 133 and a tailings conveyor floor 134 ending respectively above a clean grain auger 135 and a tailings return auger 136. The lower cleaning shoe 132 is arranged to support a lower cleaning sieve 137 so that it has its forward edge forwardly of and below the discharge end of the intermediate grain pan 102 and its rear edge forwardly of and below the level of the chaffer sieve extension 118.

The lower cleaning shoe 132 is movably supported on the chassis at 138 (chassis not shown) via rocking arms 139 and at 141 (chassis again not shown) via rocking arms 142. The rocking arms 142 on both sides of the cleaning mechanism are extended above the level of the pivots 141 on the chassis and are pivotally coupled at 143 to the upper cleaning shoe 107.

The drive means for the cleaning shoes with the grain pans and cleaning sieves coupled thereto, respectively mounted thereon comprise crank shafts 144 extending between on the one hand eccentrics 145 on the intermediate shaft 146 and the pivots 147 on the lower cleaning shoe 132.

The cleaning fan, which is generally indicated at 151 is disposed generally below the forward grain pan 101 and comprises a fan housing 152 of cylindrical shape with a pair of opposite air inlets 153. A further air inlet 154 is provided over a portion of the cylindrical body over the full width of the housing at the top end thereof. This additional inlet is covered by a perforated shielding 158 to keep impurities out of the fan housing 152.

An outlet 155 is provided in the cylindrical body over the full width thereof and which communicates with a combined outlet structure 159 comprising a main outlet duct 163 and an additional outlet duct 164.

The main outlet duct 163 extends upwardly and rearwardly and faces the underside of the lower sieve 137, the underside of the chaffer sieve 114 and the space between the discharge end of the intermediate grain pan 102 and the lower sieve 137 as well as the area below said lower sieve. The main outlet duct 163 comprises a bottom wall 165 which extends tangential with the cylindrical body of the fan housing 152 and a top wall 166 which is oriented more or less parallel to the bottom wall 165. The top wall has a forward end 167 at a distance from the circumference of the fan 157 and which is rounded to go over in a substantially vertical wall 168 of the additional outlet duct 164. An angularly adjustable baffle 169 is arranged at said forward end 167 of the top wall 166 and is capable of more or less throttling the additional outlet duct 164. A pair of deflector baffles 161,162 are angularly adjustably provided in the main outlet duct 163.

The additional outlet duct 164 is confined by the wall section 168 already mentioned and a further wall section 171. The further wall section 171 extends generally parallel to a tangential to the circumscribing line of the fan 157 and has its lower edge closely adjacent said circumscribing line and at a distance slightly above the level of the lower end of said wall section 168. The upper portion of the wall section 171 comprises a bent of almost 90° and faces rearwardly and upwardly above the level of the top edge of the other wall section 168 which comprises a sealing strip 172 sealingly engaging the underside of the intermediate grain pan 102. The additional outlet duct 164 is disposed so that its outlet faces the area between the discharge end of the front grain pan 101 and the leading edge of the intermediate grain pan 102. The leading edge of the precleaning sieve 113 is positioned at about the middle of this area.

The additional fan inlet 154 mentioned above extends from the upper edge of said wall section 171 in the direction of rotation 156 of the fan 157. Thus in other words, the additional inlet 154 is provided rearwardly of the outlet 155 when seen in the direction of rotation 156 of the fan 157.

The fan 157 comprises a central shaft 173 with a number of supporting arms 174 extending generally radially outwardly therefrom and carrying at their outer ends fan blades 175 of special shape. Indeed, the fan blades 175 are concavely shaped with the concave side facing in the direction of rotation 156. Preferably the blades 175 are made of sheet metal with a central, generally flat section 176 at a small angle in advance of the radius of the fan 157 and angled inner and outer portions respectively 177,178 defining with said sections 176 said generally concave shape. The outer portions 178 thus are provided at a greater angle in advance of the radius than the central sections 176 and the inner portions 177 are provided at an angle trailing relative to the radius. Thus, so called "forwardly curved" fan blades are provided. It will also be understood from what precedes, that the cleaning fan according to the invention is a combination of a so called "centrifugal fan" and a so called "cross-flow fan".

With the parts assembled as set forth above, the machine is driven in a field with standing crop and the latter is cut and conveyed by the reel 15 and the header auger 16 to the straw elevator 13. The straw elevator 13 feeds the crop in a layer of more or less even thickness and of a width corresponding to the full width of said elevator to the threshing mechanism 17. The threshing cylinder 18 is rotated at a relatively high speed and the rasp bars 23 strike the crop supplied thereto and entrain it in a rearward direction for passing it between the threshing cylinder 18 and the threshing concave 19. While passing therebetween, the crop material is rubbed and beaten whereby the grain kernels are loosed from the ears, this means whereby the crop is threshed. A major percentage of the grain together with impurities immediately falls through the meshes of the threshing concave 19 and is thus already separated from the straw.

The straw mat or layer is passed from the threshing cylinder 18 and concave 19 in a rearward and upward direction towards the straw beater 28 which is operative to comb off said layer from the threshing cylinder 18, to deflect it in a rearwardly extending direction between itself and the beater grate 29 and to pass it on to the separator cylinder 42 while submitting it already to some separating action. Indeed a small percentage of grain is separated together with impurities through the beater grate 29.

As the straw mat issues from the gap between the straw beater 28 and the beater grate 29 over the full width thereof, it is intercepted by the separator tines 47 of the separating cylinder 42. These tines 42 hit with their leading, active surfaces 48 on sections of the mat and thereby deflect the mat in a downward direction between the separator cylinder 42 and the associated concave 43. This bearing action on the crop mat and on the remaining grain kernels therein is particularly vigorous due to the orientation of the crop mat at a substantially right angle relative to the direction of movement of the tines 47 at the point where said tines intercept said crop mat. This results in an abrupt change in direction of movement of the crop mat with the grain kernels therein and as the grain kernels have a greater specific weight than the straw particles, and thus also have a greater inertia, the separator tines 47 are operable, especially at the inlet end of the separator mechanism 38 to hit these grain kernels toward the lower regions of the crop layer and eventually also through the separator concave 43 with a high degree of efficiency. This high efficiency is further also enhanced by the fact that on the one hand the separator tines 47 have a relatively narrow width, and on the other hand the separator tines 47 on adjacent rows are staggered relative to each other.

Due to the generating line of the separator tines 47 passing closely adjacent the generating line of the straw beater plates 33, the separator tines 47 exert an efficient combining action on any material which would have a tendency to wrap around the straw beater beyond the discharge end thereof.

The separator tines 47 entrain the crop mat over the full width of the cylinder 42 across the separator concave 43 towards the discharge end thereof while submitting it to a continued separating action; this means a continued urging of the grain kernels towards the lower regions of the crop mat and eventually through said concave. Also, though a lesser degree, a sustained threshing action is exerted on the crop mat to loose grain kernels which still would be attached to the ears.

During its movement along the separator concave 43, the crop mat is subjected to a combing action from the separator tines 47 in a manner so that the straw, which forms the mat, is oriented generally in a fore-and-aft direction of the machine and spread in a more or less even thickness transversely of the width to the separator mechanism 38. This is very advantageous in connection with the next step in the process as will be seen furtheron.

As the crop mat is conveyed from the separator mechanism 38 through the inlet 83 of the separator mechanism 41, it is intercepted by the crop treating and conveying elements 68 on the rotor 63. At the center thereof, the crop layer dividing blades 71 are active to divide the layer, which has a width corresponding to the width of the separator cylinder 42, into two substantially equally sized halves. As the straw in this layer is already oriented in a generally fore-and-aft direction as is explained above, this dividing into two halves is accomplished without any problems. The transverse staggering of the apexes of the V-shapes formed by the dividing blades 71 relative to the centerline 69 equally helps to accomplish this partition without hesitation. This was not so in the prior art structure shown in British Pat. No. 1,460,715 and the improvement by the present invention is believed to result in the first place from the orientation in the fore-and-aft direction of the straw in the separator mechanism 38 and in the second place from said staggering.

The crop layer dividing blades 71 and the crop conveying blades 73, urge the layers of crop material outwardly towards the outer generating line of the elements 68 on the rotor 63, whereby thus the crop is looped around said rotor against the inside of the rotor housing 62. This is accomplished mainly by the rearwardly inclined front edges 74 as seen in the direction of rotation 72 of the blades 71 and 73 which lead the crop towards said outermost position on top of the outer edges 75.

Also the crop layer dividing blades 71 and the crop conveying blades 73 together with the separator blades 76, because of their angled positions relative to the direction of the incoming crop stream deflect the halves of the crop mat in two opposite paths spirally around the rotor towards the opposite ends thereof. The steeper inclination of the blades 71 and 73 than of the separator blades 76 is also necessary to change the crop from a generally fore-and-aft direction of movement to said spiral movement and once the spiral movement is obtained, the lesser inclination of the separator blades 76 is enough to sustain this spiral movement.

This spiral movement is further also enduced by the stationary spiral fins 91 which start from a location rearwardly of the center of the lower separator concave 185 and lead in the direction of the outlets 84.

In operation, the movement of the crop is more or less aligned with the direction of the stationary fins 91, and thus, when this direction is projected on the development of the rotor as shown in FIG. 5 at 191, it will be seen that in this direction adjacent blades 71-73 in each row of blades overlap each other. Also, as seen in the same direction, adjacent separator blades 76 overlap each other. This overlapping avoids that at a certain moment crop material would be entrapped in the "pockets" formed between the adjacent blades 71, 73, respectively 76, whereby the spiral movement described above would be interrupted.

From the inlet 83 crop material is conveyed generally rearwardly across the middle section of the separator concave 185 between the additional fins 90, whereafter it is led in opposite spiral paths in outward directions across the upright concave section 186 but still between the opposite additional fins 90. The crop layers thereafter further move spirally across the cover 82 from an area between the fins 90 towards an area outside these fins 90 on the concave sections 187. Thus the crop layers now are moved in the areas between the opposite rotor ends and the sides of the inlet 83. The crop finally passes for a second time over the lower separator concave 185; this time at the outer sections thereof which are located between the opposite rotor ends and the additional fins 90, whereafter the layers are discharged through the outlets 84 onto the ground. Thus, as appears from what precedes, the crop layers loop about 1.25 times around the rotor 63 and where appropriate the loop sections are neatly separated from each other by the additional fins 90.

At the opposite ends of the rotor, discharge blades 79 are provided which extend parallel to the rotor axis as no further axial movement should be enduced to the crop and which help to discharge the straw from the separator mechanism 41. It will be seen on the drawings that the discharge blades 79 are shorter than the width of the outlets 84 and that these discharge blades 79 are positioned in the vicinity of the outer sections of the outlets 84, which means that the separator blades 76 partially overlap the outlets. Tests have shown that this is the most advantageous combination.

Also, as can be seen from FIG. 7, the outlets 84 have a width which is less than half the width of the inlet 83 and thus the halves of the crop mat entering the separator mechanism 41 should be consolidated to a narrower width during their movement spirally around the rotor, so as to be able to pass through the outlets without problems. This is mainly accomplished by the steep angle of the blades 71,73 relative to the centerline 69. This is moreover advantageous for the reason that thereby the crop layers move past the side edges of the inlet 83 without any hesitation at the point where the first loops around the rotor 63 are completed.

Tests have also shown that the crop conveying blades 73 can be omitted and that thus the halves of the layer entering the inlet 83 can be deflected sufficiently quickly into the spiral paths 191 as required with only the crop layer dividing blades 71 and the stationary fins 91.

As the material is moved spirally around the rotor 63 from the housing inlet 83 to the opposite outlets 84, the outer edges 75 and 78 of the crop layer dividing and crop layer transporting blades 71,73, respectively the separator blades 76 rub on the crop mat and rub said mat across the separator concaves 81 whereby the crop is submitted to a further and final sustained grain separating action. Grain kernels separated by this rubbing action and under influence of the centrifugal forces acting thereon, move through the concaves 81. Grain separated in the central portion of the mechanism 41 falls directly onto the rear grain pan 103, while that grain separated in the opposite end sections of the mechanism 41 is collected and conveyed to the front grain pan 101 by mechanisms shown and described in more details in the co-pending application.

As the separator rotor 63 is rotated in the direction 72, the blades 71,73,76 and 79 described above cause air blasts which are directed from a location centrally and rearwardly of the separator mechanism 41 around the rotor 63 and mainly within the housing 62 towards the opposite ends of said mechanism and forwardly thereof. If no special precautions were taken, these air blasts would create a suction in the area above the third grain pan 103 rearwardly of and below the separator mechanism 41, whereby dust, straw particles, chaff, etc. would be sucked into the cavity between the separator concave 186 and the deflector plate 92. After a short period of time this would be filled up completely and thus the separator concave 186 would get plugged so that the separating surface would be diminished which in turn would result in a reduced separating efficiency.

According to one aspect of the invention an opening 95 is provided between the deflector plate 92 and the top shielding 94, this means substantially at the upper portion of the cavity between the concave 186 and the plate 92, where the build up of chaff etc. and the plugging has a tendency to start when nothing is provided to counteract this. This opening 95 is provided at a substantial height above the cleaning mechanism 11 and at a location where grain kernels separated through the concave 186 have no tendency to pass therethrough. The air blasts described above now create a suction through the opening 95 and thus chaff, etc. is no longer lifted from the cleaning mechanism 11, which means that plugging of the concave 186 is avoided.

If no special precautions were taken in connection with the concave section 89, this means, if in this area, as anywhere else on the separator concaves 81, transverse separator concave bars 86 are provided, there would be a tendency for this concave section to plug with crop material whereby the separating efficiency would be reduced. This drawback, which appeared from experiments, apparently is due to the fact that in this concave area the concave bars 86 would have a wrong orientation for gravity to successfully help cleaning said section. Indeed, in said section the separator concave bars would have their flat sides extending generally horizontally or even in an upward incline as seen from the inside of the separator housing 62 to the outside thereof. Thereby material which falls thereon appears to be a tendency to stay thereon. This is particularly true for straw particles. This drawback furthermore is clearly also interrelated with the drawback of the above described cavity getting filled up with chaff, etc. and for which a separate solution has already been described.

Removing the transverse separator bars 86 in the concave section 89 has not totally solved the problem, although straw can no longer hook around the transverse bars in this concave area. Indeed, it has been experienced that, when a number of bars 86 were omitted, there is a tendency for long straw stalks to stick through the elongate slots between the ends of the concave wires 87, to hit the shielding portion 94 and to crumple up as a result thereof, whereafter said crumpled straw now hooks around the concave wires 87 hanging partly inside and partly outside the housing 62. When this occurs, complete plugging follows soon thereafter. The opening or free space 192 between the ends of the concave wires 87 and the adjacent edge of the cover plate 82 allows the separator rotor 63 to strip off the ends of the concave wires 87 and to draw back in the separator housing 62 any crumpled straw that has accumulated in the area 89 of the separator concave 81. Thus the separator mechanism 41 has a self-cleaning effect in the concave area 89. The air blast described above and which appear mainly in the central portion of the separator mechanism 41 help in moving crumpled straw back in the rotor housing so that plugging is avoided. Thereby also the separating efficiency is kept particularly high.

Having so far described the threshing and separating functions of the machine, the cleaning function will now be reviewed in more detail. The components of the cleaning mechanism 11 are driven; this means the fan 157 is rotated in the direction 156 and the cleaning shoes 107,132 with the elements attached thereto are oscillated. The lower cleaning shoe 132 is oscillated back and forth along a generally rearwardly and slightly upwardly extending path 181. The upper cleaning shoe 107 is oscillated in substantially the same direction but with a phase displacement of 180°. The third grain pan 103, by virtue of its pivotal mounting on the upper cleaning shoe 107 and its drive received therefrom in the manner as described above, is caused to oscillate back and forth along a generally forwardly and upwardly directed path. Cleaning air blasts are directed through the outlet ducts 163,164 of the fan housing 152.

Material separated through the threshing concave 19, the beater grate 29, portion of the separator concave 43 associated with the separator cylinder 42 and through the concave sections at the opposite ends of the separator mechanism 41 falls directly onto the grain pan 101 which, especially on large capacity combines may be fairly thick. On top of that, rethreshed tailings may be added thereto as is shown and described in co-pending application. Material separated in the central portion of the separator mechanism 41 and in the rear portion of the mechanism 39 falls directly onto the rear grain pan 103. By virtue of the particular oscillatory movements in generally opposite directions of the grain pans 101,103, material thereon is gradually moved towards the respective discharge ends thereof while allowing the heavier grain kernels to "sink" to the lower portions of the layers of material and thus the lighter chaff, straw dust and other light impurities to come on top thereof.

As the layers drop off the discharge ends of the grain pans 101,103, they are fluffed out by the comb assembly 104, whereafter a strong air blast is directed from the fan outlet duct 164 in a rearward direction onto and through the fluffy layers as they fall off said discharge ends towards the precleaning sieve 113. Thereby a major percentage of light impurities (chaff, dust, straw, etc.) immediately becomes airborne and is moved in the direction of the discharge end of the cleaning mechanism. Directing an air blast onto and through a fluffed out layer of material during its fall is much more effective for cleaning than when the same air blast is directed onto and through a layer which is positioned on top of a cleaning sieve. It should also be remarked that the layers issuing from both grain pans 101,103 are not discharged the one on top of the other, but instead thereof, the one rearwardly of the other. Thereby, an even fluffier mass is obtained. Also, at this point in the machine, there is no great risk for a strong air blast to blow grain kernels out of the machine, which then would cause increased losses. Thus a strong air blast may be applied and accordingly, a good precleaning is accomplished.

A layer of already reduced thickness thus falls on top of the precleaning sieve 113, the mesh of which is adapted to the kind of crop to be handled. A cleaning air blast is directed from below through this precleaning sieve as well as through the area between said sieve and the intermediate grain pan 102 therebelow. As the layer is moved across the sieve towards its discharge end, grain cleaned to a great extent, falls through said precleaning sieve and cross said air blast onto the intermediate grain pan 102 and is conveyed therefrom directly to and dropped onto the lower sieve 137 of the main cleaning mechanism formed by said lower sieve and the chaffer sieve 114 thereabove. During this fall from the intermediate grain pan 102 to the lower sieve 137, the grain is again subjected to a cleaning air blast, which now issues from the main outlet duct 163. It will also be noted here that grain separated through the precleaning sieve 113 bypasses the chaffer sieve 114.

The remainder of the layer on the precleaning sieve 113 is fluffed out again as it falls through the comb assembly 116 onto the chaffer sieve. Again a cleaning air blast, issued from the additional outlet duct is directed onto this layer during its fall and the profile 112 at the rear end of the precleaning sieve 113 is so shaped and oriented so as to also direct some cleaning air on the underside of the comb assembly 116. A further percentage of impurities thus becomes airborne and together with the impurities coming from the stage above, carried out of the machine.

Even though the total capacity of the machine and thus also of the entire cleaning mechanism 11 is very high, the loading of the chaffer sieve 114 has been reduced substantially and thus the efficiency thereof has been increased accordingly. Indeed a large percentage of impurities is already separated before the layer reaches the chaffer sieve 114 on the one hand, while on the other hand, a large percentage of partially cleaned grain is directed from the intermediate grain pan 102 directly to the lower sieve 137 thus bypassing the chaffer sieve 114. Due to this reduced loading of the chaffer sieve, the layer thereon can be better blown through by the cleaning air blast without any undue risks for losses to occur and thus all impurities more easily become airborne and discharged.

The main cleaning device, that is the chaffer sieve 114 together with the lower sieve 137 and the associated fan outlet duct 163 operate in a generally conventional manner. A cleaning air blast is directed through the areas below both sieves 114,137 as well as through said sieves from below. Thereby the remaining impurities become airborne and blown out of the machine while that cleaned grain falls through the sieves and through the cleaning air blasts onto the clean grain conveyor floor 133, which conveys said cleaned grain to the clean grain auger 135 for transporting it to the graintank 8.

Tailings which are too large to fall through the chaffer sieve 114 are conveyed to the sieve extension 118, where they either fall through the larger apertures or through the comb assembly attached thereto. Tailings are collected on the tailings conveyor floor 134 which conveys them to the tailings return auger 136 for recycling and reprocessing.

The cleaning fan 151 operates partially as a centrifugal fan and also partially as a cross flow fan. The fan blades 175 are operable to draw air in, not only through the opposite inlets 153 as in conventional centrifugal fans, but also through the transverse inlet 154 as in conventional cross flow fans. This has become possible due to a.o. the special design of the fan blades 175 which are concavely shaped as seen in the direction of rotation and which basically are oriented at a sharp angle in advance of the radius of the fan. As a result thereof, the cleaning air blast is fairly even, transversely of the cleaning mechanism even with fairly wide cleaning fans. Even transverse air pattern is an absolute requirement for a highly efficient cleaning device. This also means that a wider cleaning mechanism can be provided. Also the cleaning air volumes produced by the fan according to the invention are substantially increased whereby again higher capacities are obtainable.

The major percentage of cleaning air is expelled from the fan housing through the main outlet duct 163 while that the remainder is directed through the additional outlet duct 164. The proportion of cleaning air issuing from both outlet ducts 163,164 is adjustable by the angularly adjustable baffle and thus cleaning air blasts can be directed where needed.

It will be seen that with the present invention a high capacity threshing mechanism is combined with a high capacity separating mechanism. The high capacity separating mechanism is obtained mainly in the combination of the separator cylinder and cooperable concave on the one hand and the separator rotor and associated housing on the other hand. Separation in the first component to a great extent is based on the separator tines impacting on the kernels while that separation in the latter component results to a great extent from the sustained centrifugal forces to which the grain kernels are subjected. Yet a smooth flow of the crop through the machine is obtained. This is partially due to the fact that the separator cylinder reorientates the straw in the layer prior to the layer dividing blades actually dividing the layer in two halves. Furthermore, spiral movement to the discharge ends is positively enduced and under control by the provision of the separator blades at a fairly small angle relative to the rotor axis in combination with the stationary fins on the inside of the rotor housing. Starting of this spiral movement is positively enduced by the provision of the layer dividing blades and eventually also the crop conveying blades at much steeper angle relative to the rotor axis.

Problems with air turbulences created by the separator rotor causing components of the rotor housing to plug have been overcome in a very simple manner.

High capacity threshing and separating mechanisms necessarily require high capacity cleaning devices, especially on rotary combines which are known to more heavily load the cleaning mechanisms with short straw then the so called conventional combines. First of all, the rear grain pan shields the cleaning mechanism from the separating mechanism so that grain separated in the latter cannot fall directly on the cleaning sieves rearwardly of the leading end thereof. Instead thereof, this material is conveniently conveyed to a more forward location of the cleaning device in a direction opposite to the direction of flow through the remainder of the cleaning mechanism.

The cleaning mechanism according to the present invention can handle greater volumes of material for a plural number of reasons. Indeed, the special fan with three air inlets and special shaped fan blades not only produce larger volumes of cleaning air, but also produces a more even transverse wind distrubtion across the sieves. As a result thereof wider cleaning sieves and an accordingly wider fan may be provided without hampering the transverse wind distribution as used to be the case with conventional arrangements. Also the provision of an additional fan outlet has made possible to direct a cleaning air blast on a precleaning arrangement, whereby the loading of the conventional cleaning sieves is reduced considerably and their efficiency improved accordingly. Indeed, though the total layer of material received from the threshing and separating mechanism is thicker, a thinner layer is received on the chaffer sieve, as a large percentage of clean grain is directly led to the lower sieve thus bypassing the chaffer sieve on the one hand, and as a large percentage of impurities becomes airborne before reaching the chaffer sieve. Also cleaning air blasts are directed at various locations through falling fluffed out layers of material whereby a greater cleaning efficiency is obtained.

Figure 13:
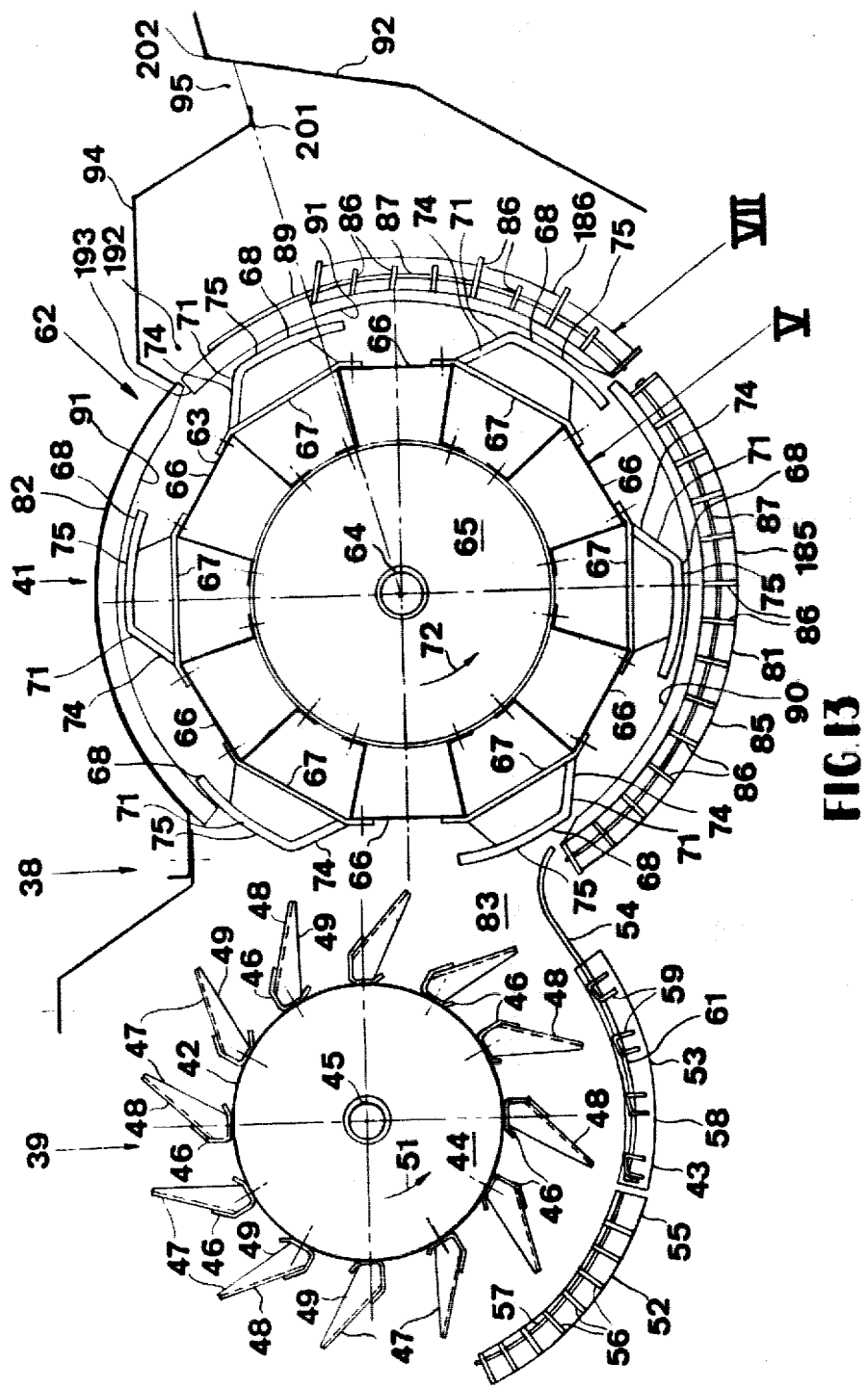
FIG. 13 is a view similar to FIG. 3 showing an alternative arrangement.

While a specific embodiment of the invention has been illustrated and described, it will be apparent to those skilled in the art that various alterations and modifications in the construction and arrangement of components can be made. For example, the deflector plate 92 and the shielding 94 with the air inlet 95 therebetween and which define the open ended cavity may be arranged in a different manner as is shown in FIG. 13. Indeed, in the arrangement of FIG. 3 it may occur that grain kernels which are separated through the upper section of the separator concave 186 are projected through the air inlet 95 whereby they thus are not deflected by the deflector plate 92 towards the cleaning defice therebelow. In the arrangement according to FIG. 13, the shielding 94 has a generally downwardly facing concave shape with a rear and lower edge 201 at a location generally forwardly of and generally at the level of, or even below the level of the upper edge 202 of the deflector plate 92. Thereby the air inlet 95 is now disposed generally horizontally or even at a downward incline as seen in the forward direction as opposed to the generally vertical orientation of FIG. 3. Grain kernels which are projected generally radially away from the upper section of the separator concave portion 186, thereby are prevented from being projected through the air inlet 95, and thus are deflected by the concave shielding 94 and the deflector plate 92 to the cleaning device therebelow.

Figure 14:
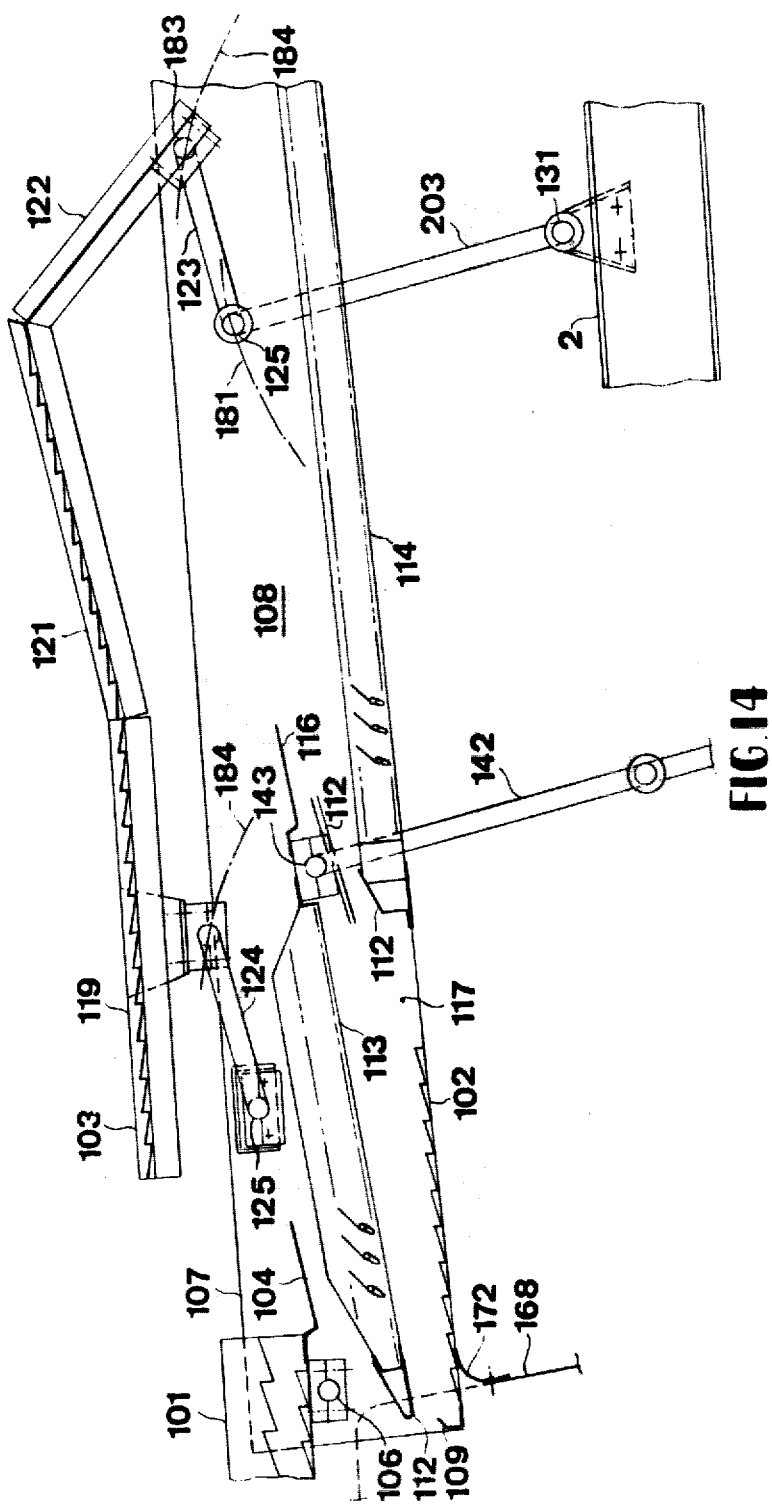
FIG. 14 is a view similar to FIG. 9 showing an alternative arrangement of a section of the cleaning device.

Also the drive and suspension means for the third grain pan 103 may be different from the drive and suspension means shown in FIGS. 2 and 9. In one such alternative arrangement as is shown in FIG. 14, the rear rocking arm 115, the link 129 and the further link 130 on each side of the machine may be replaced by a single link 203 which is rigidly coupled at pivot 125 to the associated crank 123 in a manner defining with said crank 123 an angle, which preferably is in the range of 90°. The crank 123 and link 203 on each side of the machine are disposed so that the pivot 125 is positioned at one side relative to the vertical through pivot 131 and that the pivot 183 is positioned at the opposite side relative thereto. Preferably each link 203 is positioned parallel to the rocking arms 142 and its length corresponds to the distance between the pivots 141 and 143 of said rocking arms.

As is shown in FIG. 14, the connecting rods 126 may be omitted. This is possible and practical only provided in all operating positions the pivotal couplings between the cranks 123 and further cranks 124 on the one hand and the grain pan 103 on the other hand remain sufficiently far away from the dead centerline relative to the pivots 125. Preferably, the cranks 123,124 are inclined upwardly in a rearward direction from the pivots 125, have the same length and extend parallel to each other.

Alternatively the further cranks 124 may be replaced by cranks which are pivotally coupled at one end to the grain pan 103 and at the other end to the chassis 2. Preferably, in this arrangement, these cranks extend parallel to the imaginary straight line between the pivots 183 and 131 at the rear of the grain pan 103 and have a length which corresponds to the distance between said pivots.

In still a further alternative, the connecting rods 126 may be omitted and the further cranks 124 and upper halves of the rocking arms 142 may be firmly coupled together in a manner to form supporting and drive means which are congruous to the structures formed by the links 203 and cranks 123 of FIG. 14.

It is anticipated that aspects of the present invention, other than those specifically defined in the appended claims, can be obtained from the foregoing description and the drawings.

Having thus described the invention, what is claimed is:

1. A combine harvester comprising:
  a transversely extending threshing mechanism having a threshing cylinder cooperable with a threshing concave for threshing a layer of crop material fed therebetween;
  a separating mechanism having a separator rotor cooperable with a separator housing including a separator concave and disposed parallel to the threshing mechanism;
  crop layer dividing means on the separator rotor for dividing the layer of crop material received from the threshing mechanism into two portions and separator means extending lengthwise of the rotor and arranged spirally to convey said portions of the crop layer received from the threshing mechanism around said rotor in opposite directions to the opposite ends of the separating mechanism while submitting the crop material to a separating action;
  the crop layer dividing means being formed by crop layer divider blades disposed in pairs around the circumference of the separator rotor and at opposed angles relative to the direction of rotation in a manner defining V-shapes having their apexes facing in the direction of rotation; and
  the leading edges as seen in the direction of rotation of the rotor of each pair of crop layer divider blades are transversely spaced apart.

2. A combine harvester according to claim 1 wherein the separator rotor comprises at its opposite ends discharge blades extending generally radially outwardly from the circumference of the rotor and parallel to the rotor axis thereof.

3. A combine harvester according to claim 2 wherein six discharge blades are provided on the circumference of the rotor at each end thereof.

4. A combine harvester according to claim 2 wherein the separator means extending lengthwise of the separator rotor comprise separator blades substantially bridging the spacing between the crop layer dividing blades and the discharge blades.

5. A combine harvester according to claim 4 wherein the separator blades project generally radially outwardly and extend from in the vicinity of the crop layer divider blades to the vicinity of the discharge blades at an angle relative to the rotor axis and in a rearward direction as seen in the direction of rotation.

6. A combine harvester according to claim 5 wherein the angle is in the range of 15°.

7. A combine harvester according to claim 5 wherein six separator blades are provided on the circumference of the rotor at each side of the center thereof.

8. A combine harvester according to claim 7 wherein each separator blade is coupled to a corresponding discharge blade.

9. A combine harvester according to claim 4 wherein the separator blades and discharge blades are formed of sheet metal and comprise a generally radially outwardly extending body and an outer edge bent rearwardly as seen in the direction of rotation.

10. A combine harvester according to claim 4 wherein each separator blade has its leading end closely adjacent the rear end of the corresponding crop layer dividing blade.

11. A combine harvester according to claim 4 further also comprising an additional crop conveying blade between each crop layer dividing blade and the associated separator blade at a distance from, and parallel to said crop layer dividing plate.

12. A combine harvester according to claim 11 wherein each separator blade has its leading end closely adjacent the rear end of the corresponding crop layer conveying blade.

13. A combine harvester according to claim 11 wherein each crop conveying blade comprises an outwardly and rearwardly inclined leading edge as seen in the direction of rotation and an outer slightly arcuate edge generally coincident with the outer circumscribing line of said separator rotor.

14. A combine harvester according to claim 11 wherein each crop layer dividing blade and the adjacent crop conveying blade overlap each other when seen in the direction of the spiral movement of crop material around the rotor.

15. A combine harvester according to claim 14 wherein the separator housing comprises a central forwardly facing inlet of a width substantially smaller than that of the housing for receiving crop material from the threshing mechanism and substantially rearwardly facing outlets at the opposite end portions thereof and transversely offset relative to the inlet for the discharge therethrough of crop material.

16. A combine harvester according to claim 15 wherein substantially vertical separator concaves extend between the ends of the separator housing and the inlet on the one hand, and between the opposite outlets on the other hand.

17. A combine harvester according to claim 15 wherein the separator housing comprises a separator concave in the lower part thereof between the inlet end and the outlets, and a cover plate in the upper part thereof.

18. A combine harvester according to claim 15 wherein the inlet is substantially rectangular and the width thereof substantially correspond to the width of the threshing mechanism.

19. A combine harvester according to claim 15 further also comprising fins spirally extending in opposite directions on both sides of the fore-and-aft center of the separator housing on the inside thereof from a location rearwardly of the inlet, as seen in the direction of rotation of the separator rotor and at a sharp angle relative to the direction of rotation.

20. A combine harvester according to claim 19 wherein the angle is in the range of 25°.

21. A combine harvester according to claim 19 wherein a plurality of fins are provided at each side of the center at equispaced locations and parallel to each other.

22. A combine harvester according to claim 21 wherein the central fins start on the center and thus form a V-shape with the apex facing opposite to the direction of rotation of the separator rotor.

23. A combine harvester according to claim 21 wherein three fins are provided on each side of the center, the forward ends thereof being positioned on a line transversely of the machine.

24. A combine harvester according to claim 22 wherein the inner pair of fins on each side of the center end aligned with the lower edge of the inlet at locations between said inlet and the opposite ends of the separator housing.

25. A combine harvester according to claim 23 wherein the outer pair of fins on each side of the center end short of the adjacent end of the separator housing at substantial equal distances from said adjacent end.

26. A combine harvester according to claim 25 wherein the outer fin on each side of the center ends aligned with top edge of the inlet at a location between said inlet and the adjacent end of the separating housing.

27. A combine harvester according to claim 19 wherein additional fins extend alongside the opposite sides of the inlet, spirally outwardly across the lower portion of the separator housing and alongside the inner sides of the outlets.

28. A combine harvester according to claim 15 wherein the discharge blades have a length which is substantially smaller than the width of the outlets in the separator housing.

* * * * *